United States Patent
Pomaranski et al.

(10) Patent No.: US 7,146,530 B2
(45) Date of Patent: Dec. 5, 2006

(54) TARGETED FAULT TOLERANCE BY SPECIAL CPU INSTRUCTIONS

(75) Inventors: Ken Gary Pomaranski, Roseville, CA (US); Andrew Harvey Barr, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

(21) Appl. No.: 10/623,099

(22) Filed: Jul. 18, 2003

(65) Prior Publication Data

US 2005/0015659 A1  Jan. 20, 2005

(51) Int. Cl.
  *G06F 11/00* (2006.01)
(52) U.S. Cl. ............................... 714/11; 714/13
(58) Field of Classification Search ............. 714/11, 714/12, 13
  See application file for complete search history.

(56) References Cited

U.S. PATENT DOCUMENTS

| | | | |
|---|---|---|---|
| 5,138,708 A * | 8/1992 | Vosbury ..................... 714/11 |
| 5,148,432 A * | 9/1992 | Gordon et al. ................. 714/7 |
| 5,317,726 A | 5/1994 | Horst |
| 5,488,716 A * | 1/1996 | Schneider et al. ............ 714/10 |
| 5,600,784 A | 2/1997 | Bissett et al. |
| 5,845,060 A * | 12/1998 | Vrba et al. .................... 714/12 |
| 2002/0054521 A1* | 5/2002 | Sato ........................... 365/200 |

OTHER PUBLICATIONS

Joydeep Ray, et al. "Dual Use of Superscalar Datapath for Transient-Fault Detection and Recovery", International Symposium on Microarchitecture archive, 2001, pp. 214-224, IEEE Computer Society, Washington, DC, USA.

\* cited by examiner

*Primary Examiner*—Dieu-Minh Le

(57) ABSTRACT

One embodiment disclosed relates to a microprocessor for targeted fault-tolerant computing. The microprocessor's decode circuitry is configured to decode a fault-tolerant version of an instruction and a non-fault-tolerant version of the instruction distinctly from each other. The microprocessor's execution circuitry is configured to execute the fault-tolerant version of the instruction with redundancy checking and to execute the non-fault-tolerant version of the instruction without redundancy checking.

21 Claims, 4 Drawing Sheets

Program A using fault tolerance
302

Program B not using fault tolerance
303

```
Load x -> R1
Load y -> R2
FT_MULT(R1,R2) -> R3
Store R3
```

TARGETED FAULT TOLERANCE BY SPECIAL CPU INSTRUCTIONS

BACKGROUND OF THE INVENTION

1. Field of the Invention

The present invention relates generally to computer systems. More particularly, the present invention relates to fault tolerant and highly available computer systems.

2. Description of the Background Art

Previous solutions for providing fault tolerance in digital processing are either hardware based, software based, or some combination of both. Fault tolerance may be provided in hardware by running two full central processing units (CPUs) in lockstep, or three CPUs in a "voting" configuration. For example, a system may employ three CPUs executing the same instruction stream, along with three separate main memory units and separate I/O devices which duplicate functions, so if one of each type of element fails, the system continues to operate. Unfortunately, such systems include tremendous system overhead, not only in terms of the number of CPUs required, but also in terms of the infrastructure supporting the CPUs (memory, power, cooling systems, and so on).

Software based solutions typically rely on complete re-running of a program at least three times. This results in effective execution times that are three times longer than if the program was run only once. Combination schemes require both extra hardware (for example, twice the hardware) and extra processing. The extra processing may take the form of software check-pointing. Software check-pointing pertains to the ability to, on an error, "replay" a specific instruction sequence.

The above-discussed prior solutions are expensive in terms of cost and/or system performance. Hence, improvements in systems and methods for providing fault tolerant digital processing are highly desirable.

SUMMARY

One embodiment of the invention pertains to a microprocessor for targeted fault-tolerant computing. The microprocessor's decode circuitry is configured to decode a fault-tolerant version of an instruction and a non-fault-tolerant version of the instruction distinctly from each other. The microprocessor's execution circuitry is configured to execute the fault-tolerant version of the instruction with redundancy checking and to execute the non-fault-tolerant version of the instruction without redundancy checking.

Another embodiment of the invention pertains to a method for targeted fault-tolerant computing in a central processing unit (CPU). The method includes decoding a fault-tolerant version of an instruction to generate a first op code and decoding a non-fault-tolerant version of the instruction to generate a second op code. The first op code is executed with redundancy checking. The second op code is executed without redundancy checking.

Another embodiment of the invention pertains to a computer program product. The program product includes a first type of computer-readable instructions to be executed with redundancy checking and a second type of computer-readable instructions to be executed non-redundantly.

BRIEF DESCRIPTION OF THE DRAWINGS

FIG. 2A depicts an example instruction sequence using a fault-tolerant version of an instruction in accordance with an embodiment of the invention.

DETAILED DESCRIPTION

As discussed above, prior systems and methods for fault-tolerant digital processing have various disadvantages. The present invention relates to systems and methods for improved fault-tolerant computing.

A conventional instruction set of a modern microprocessor is composed of instructions generally optimized for performance. In accordance with an embodiment of the invention, special instructions that have fault-tolerant features are added to supplement such a conventional instruction set. For example, an arithmetic or logical operation may have two types or versions. A non-fault-tolerant version uses an execution path that is configured for rapid performance, while a fault-tolerant version uses a path with redundancy checking to assure the correctness of the result. In contrast, conventional CPUs do not typically provide such a verification option for arithmetic and logic functions. This is because the verification of these functions is typically slow and complex, which reduces performance in terms of speed. Other structures in the microprocessor, such as caches, registers, translation lookaside buffers (TLBs), and the like, are usually verified by parity bits or error correction coding.

An embodiment of the present invention utilizes special versions of certain CPU instructions to provide fault tolerance in a targeted manner. Specific operations within an application may be targeted for fault tolerance, while other operations (or other entire programs) may be performed without the overhead due to redundancy checking.

Such targeted fault tolerance has various advantages over prior solutions. It may be selectively applied to system processes, instead of being applied to all system processes. There are some processes that are not critical enough to warrant the dedication of such resources, or that are desirable to run as fast as possible (without being slowed down by redundancy checking). For example, a print spooler program is unlikely to be critical enough to need fault tolerance. In accordance with an embodiment of the invention, targeted fault tolerance allows such a non-critical program to be written without the special redundancy-checking instructions, so that the non-critical program does not unnecessarily tie up valuable system resources. On the other hand, critical programs or processes requiring redundancy checking may be written using the special instructions so as to provide fault-tolerant execution thereof. The choice may be left up to the application programmer.

Figure 1:
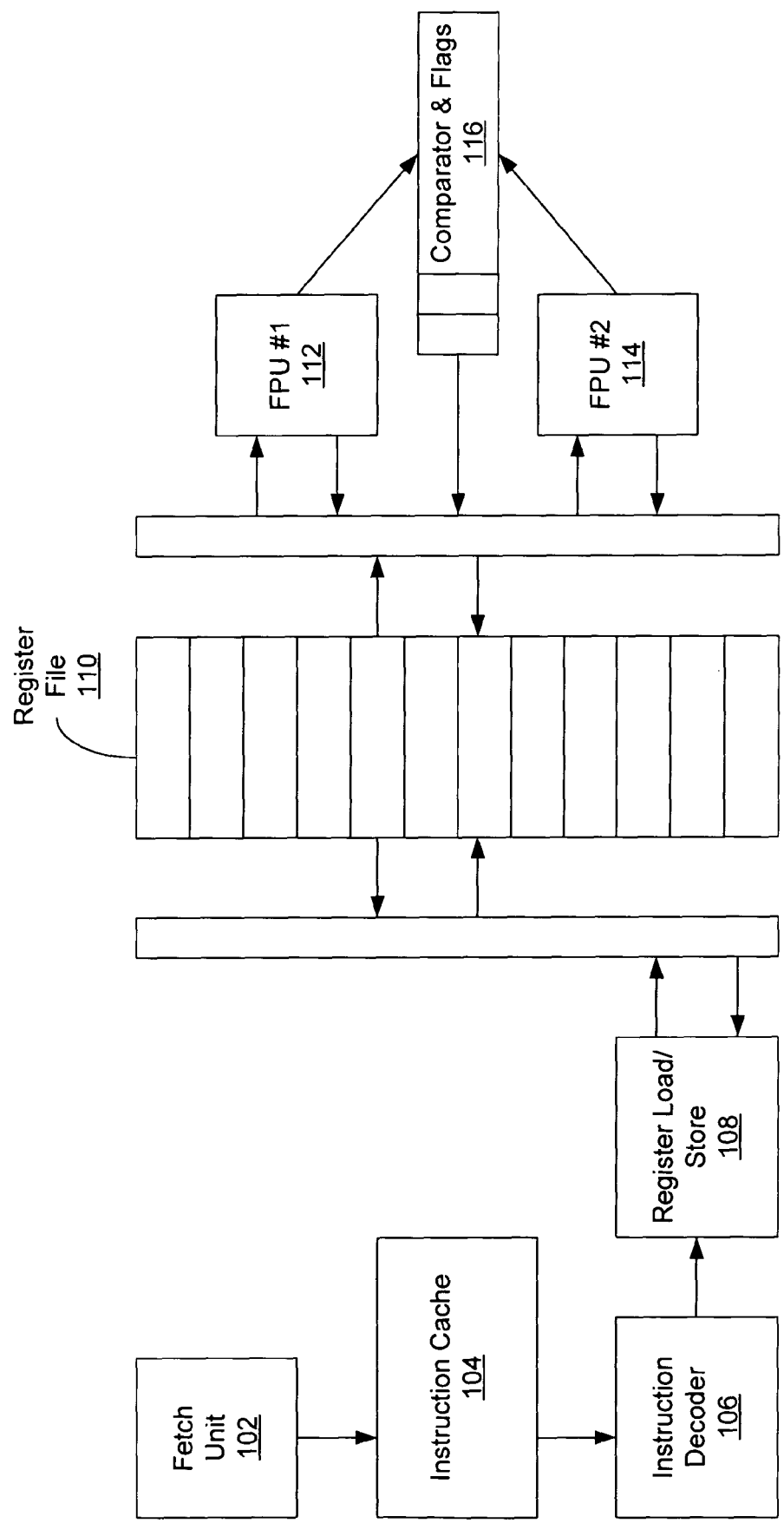
FIG. 1 is an example schematic diagram of CPU circuitry for targeted fault tolerance in accordance with an embodiment of the invention. Those skilled in the art of microprocessor design will realize that other designs that perform the same basic function can exist.

FIG. 1 is a schematic diagram of CPU circuitry for targeted fault tolerance in accordance with an example embodiment of the invention. The CPU circuitry includes a fetch unit 102, an instruction cache 104, an instruction decoder unit 106, register load/store circuitry 108, a floating point register file 110, a first floating point unit (FPU #1) 112, a second floating point unit (FPU #2) 114, and hardware comparator and associated flags 116.

Of course, the CPU includes other components and connections beyond those illustrated. The illustrated components include those pertinent to the example fault-tolerant operation discussed below in relation to FIGS. 2A and 2B.

In accordance with an embodiment of the invention, the instruction decoder circuitry 106 is configured to decode fault-tolerant and non-fault-tolerant versions of an instruction distinctly from each other. The fault-tolerant instruction may be represented by a first operation code (op code), while the non-fault-tolerant version of the same instruction may be represented by a second op code. The CPU circuitry is configured to execute the fault-tolerant version of the instruction with redundancy checking and to execute the non-fault-tolerant version of the instruction without redundancy checking.

In accordance with one embodiment, the flags (see 116) may include a first "valid" flag and a second "comparison result" flag. The valid flag may be used to indicate the validity of a stored result. The comparison result flag may indicate the result of a comparison made by the associated comparator.

Figure 2A:
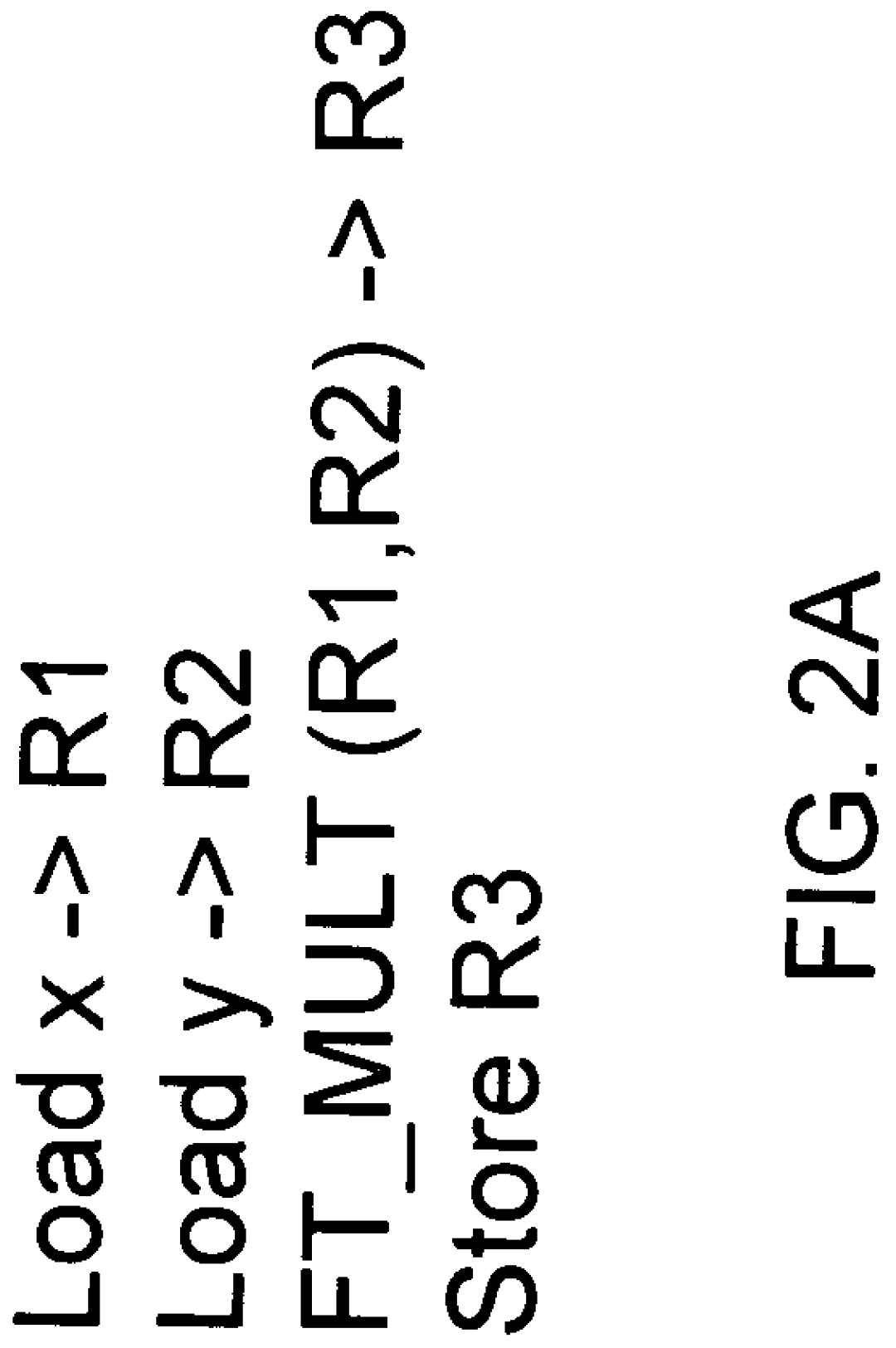

FIG. 2A depicts an example instruction sequence using a fault-tolerant version of an instruction in accordance with an embodiment of the invention. The example instruction sequence includes a fault-tolerant multiplication instruction (FT_MULT). Other examples include a fault-tolerant addition instruction (FT_ADD), other fault-tolerant arithmetic instructions, and fault-tolerant logical instructions (FT_AND, FT_NAND, FT_OR, FT_XOR, and the like).

The sequence in FIG. 2A begins by loading operand x into a first register R1 and loading operand y into a second register R2. After the registers are loaded with the operands, the multiplication operation is performed.

With a normal, non-fault-tolerant multiplication (MULT), the contents of R1 and R2 are sent directly to a floating point unit which generates a result that is stored into a third register R3. The result in R3 would be assumed to be valid for the MULT operation.

Here, however, we execute a fault-tolerant multiplication (FT_MULT). The FT_MULT operation is slower and more complex than the MULT operation. The specific steps involved in one embodiment of performing such a fault-tolerant operation is described as follows in relation to FIG. 2B.

Figure 2B:
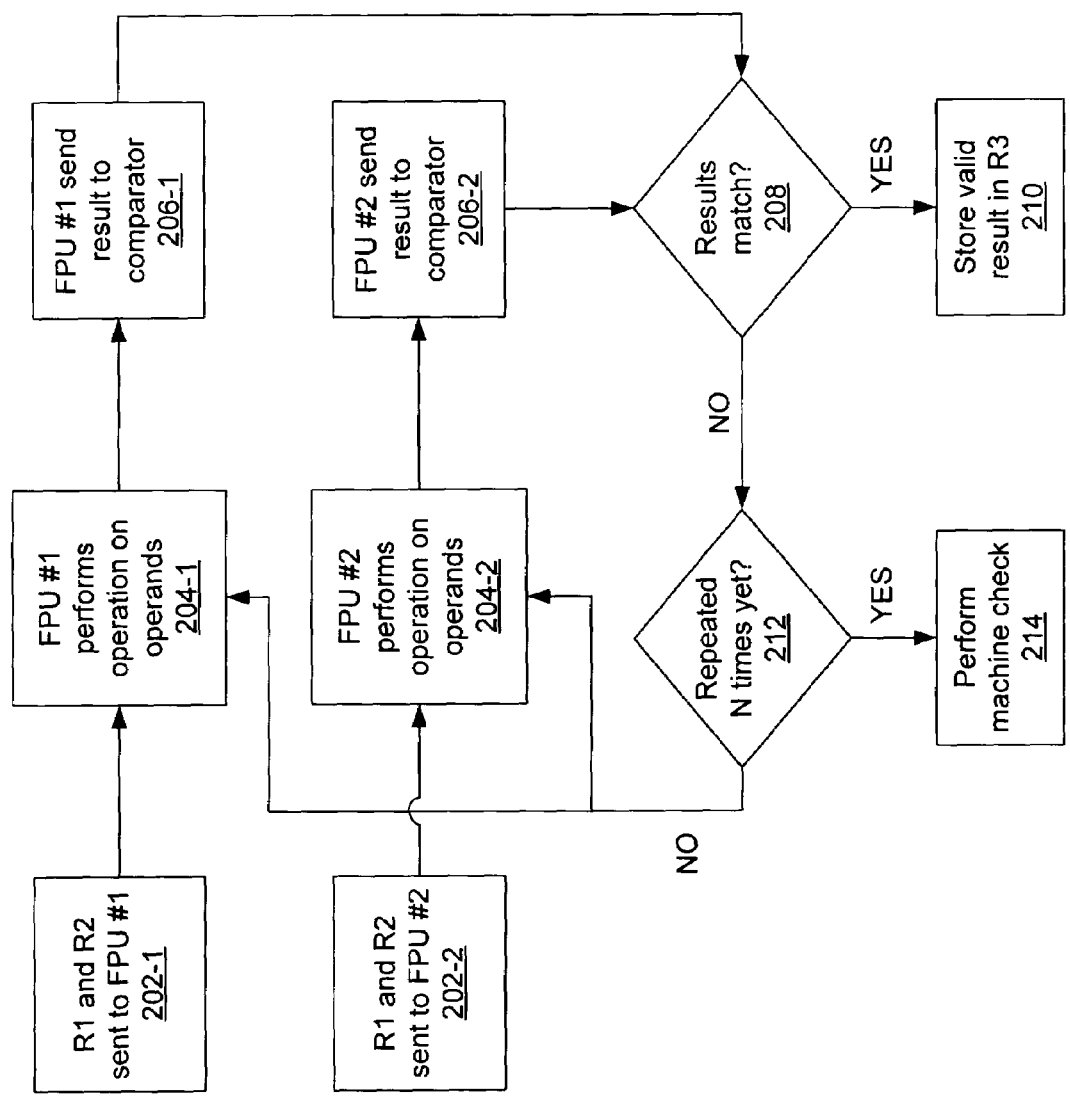
FIG. 2B is a flow chart of a process performed in a CPU during execution of a fault-tolerant instruction in accordance with an embodiment of the invention.

FIG. 2B is a flow chart of a process performed in a CPU during execution of a fault-tolerant instruction in accordance with an embodiment of the invention. The process begins by sending 202 the contents of the first and second registers (R1 and R2) both to a first floating point unit (FPU #1) and to a second floating point unit (FPU #2). As shown in FIG. 2B, this may be done in two parallel steps (202-1 and 202-2) for reasons of efficiency. For example, the circuitry may be configured as depicted in FIG. 1, with contents of R1 and R2 being loaded from the register file 110 into both FPU #1 112 and FPU #2 114 in parallel.

Each of the FPUs #1 and #2 then perform (204-1 and 204-2, respectively) the designated operation on the operands. In the case of FT_MULT, the operation is a multiplication of the two operands. The results of the operations are sent 206-1 and 206-2 by each FPU to a comparator. The comparator preferably comprises a hardware circuit 116 which is designed to rapidly compare the two results and determine 208 if they match or do not match.

If the two results do match, then a valid result is stored 210 in a third register R3. The result may be indicated as valid by setting a valid flag associated with the comparator. (A reset of the valid flag would indicate an invalid result). Finding that the results match verifies the accuracy of the operation performed.

On the other hand, if the results do not match, then a determination 212 is made as to whether the maximum N times for repeating or redoing the operation has been reached. A counter device may be used to keep track of the repeat times. In one specific implementation, N may be three times. Alternatively, N may be one time, two times, four times, or more. In one embodiment, the number N may be a parameter of the fault tolerant instruction such that N may be selectable.

If the maximum N times for repeating has been performed already, then a machine check may be performed 214 to check and/or diagnose the apparent erroneous operation of the CPU. An error message may be generated as a result of the machine check.

If the maximum N times for repeating has not been reached, then the process loops back such that the FPUs re-perform 204 the operation and re-send 206 their results to the comparator. The determination 208 is again made as to whether or not the results match. If this time there is a match, then a valid result is stored 210 in R3. If no match, then a check 212 is again made to see if the maximum repeat times has been reached. If the maximum has been reached with no match, then a machine check may be performed 214. Otherwise, the process loops back again to repeat the operation in the FPUs.

In one embodiment, a log is kept of compare errors (i.e. when the comparison results do not match). For example, if a first iteration of the operation fails the comparison, but a later iteration passes, then the compare error(s) may be logged, even if a machine check was not performed. The logging may be implemented as an additional step after a determination 208 is made that the results do not match. For instance, the logging may be performed as an additional step between blocks 208 and 212 in FIG. 2.

Figure 3:
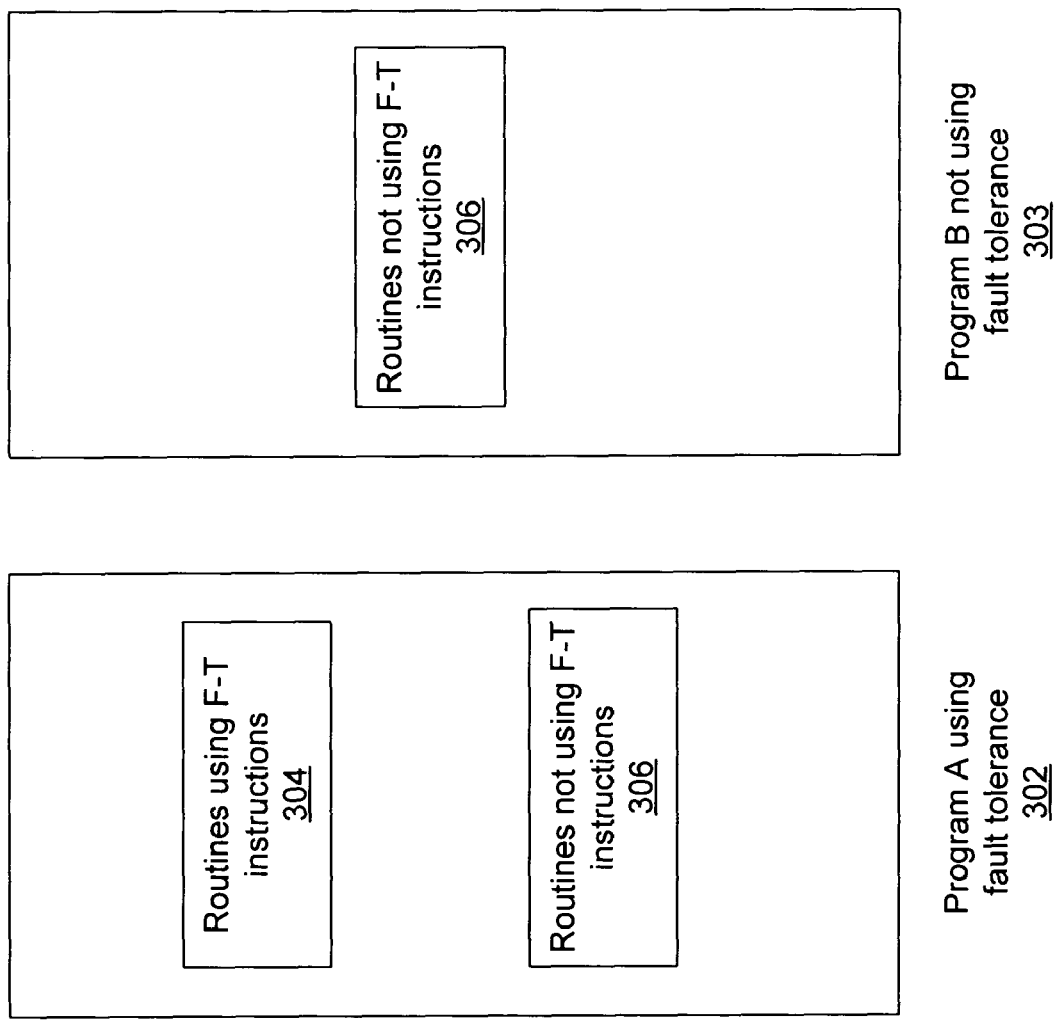
FIG. 3 is a diagram depicting two different levels of targeted fault tolerance in accordance with an embodiment of the invention.

FIG. 3 is a diagram depicting two different levels of targeted fault tolerance in accordance with an embodiment of the invention.

A first level of targeting is at the program level. An embodiment of the invention enables a program to be written with some fault-tolerant (F-T) aspects or with no fault-tolerant aspects. A program with fault-tolerant aspects is illustrated as Program A 302, while a program without fault-tolerant aspects is illustrated as Program B 303. Program A 302 includes at least one routine 304 that uses fault-tolerant versions of one or more instruction. On the other hand, Program B 303 includes only routines 306 not using any fault-tolerant versions of instructions. In other words, an embodiment of the invention enables a program to be targeted as including some fault-tolerance or not. Programs without any fault-tolerance should perform fastest.

A second level of targeting is per routine or sequence of instructions, or even per instruction, within a program. Consider Program A 302 in FIG. 3. Program A 302 includes some routines 304 that may be targeted to use fault-tolerant instructions and other routines 306 that do not use fault-tolerant instructions. The routines 304 targeted for fault-tolerance may be more critical in some aspect. For example, their calculations may be deemed as critical to be accurate, so those calculations may be targeted to be performed using fault-tolerant instructions. On the other hand, the routines 306 that do not use fault-tolerant instructions may be less critical in terms of calculation accuracy.

Embodiments of the present invention have various advantages over prior fault-tolerant computing techniques.

Hardware and/or software overhead needed to deliver fault tolerance may be reduced. This is done by allowing the program writer to target specific instructions inside of a program with an "assurance of correctness". Hardware required is reduced because this scheme does not require multiple CPUs and extra associated infrastructure. Software execution times are kept relatively fast, because the hardware itself performs the redundancy checking on a targeted basis.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A single central processing unit (CPU) for targeted fault-tolerant computing, the CPU comprising:
    decode circuitry in the single CPU configured to decode a fault-tolerant version of an instruction and a non-fault-tolerant version of the instruction distinctly from each other; and
    execution circuitry in the single CPU configured to execute the fault-tolerant version of the instruction with redundancy checking and to execute the non-fault-tolerant version of the instruction without redundancy checking.

2. The CPU of claim 1, wherein the execution circuitry includes:
    a first processing unit configured to receive operand data, execute an operation associated with the instruction; and generate a first result;
    a second processing unit configured to receive the operand data; execute the operation, and generate a second result;
    a comparator configured to compare the first and second results.

3. The CPU of claim 2, wherein for the fault-tolerant version of the instruction, if the comparison does not match, then repeating the execution by the processing units and the comparison of results by the comparator up to a maximum N times until a match occurs.

4. The CPU of claim 3, wherein, if the first and second results never match, a machine check is performed on the microprocessor.

5. The CPU of claim 2, further comprising:
    a register file configured to provide both the first and second processing units with the operand data.

6. A method for targeted fault-tolerant computing in a single central processing unit (CPU), the method comprising:
    decoding a first op code in the single CPU corresponding to a fault-tolerant version of an instruction;
    decoding a second op code in the single CPU corresponding to a non-fault-tolerant version of the instruction;
    executing the first op code in the single CPU with redundancy checking; and
    executing the second op code in the single CPU without redundancy checking.

7. The method of claim 6, wherein a set of multiple instructions is provided in fault-tolerant and non-fault-tolerant versions of each instruction in the set.

8. The method of claim 7, wherein the set of instructions includes arithmetic functions.

9. The method of claim 7, wherein the set of instructions includes logical functions.

10. The method of claim 6, wherein the execution of first op code comprises:
    providing operand data to a first processing unit;
    providing the operand data to a second processing unit;
    executing an operation on the operand data by the first processing unit to generate a first result;
    executing the operation on the operand data by the second processing unit to generate a second result; and
    comparing the first and second results.

11. The method of claim 10, further comprising, if the first and second results do not match, repeating the execution and comparison steps.

12. The method of claim 11, wherein the repeating continues up to a maximum of N times until the first and second results match.

13. The method of claim 12, further comprising, if the first and second results never matched during the N repetitions, performance of a machine check on the CPU.

14. The method of claim 11, further comprising, if the first and second results do not match, logging a comparison error.

15. A single microprocessor for targeted fault-tolerant computing, the microprocessor comprising:
    means in the microprocessor for decoding a first op code corresponding to a fault-tolerant version of an instruction and a second op code corresponding to a non-fault-tolerant version of the instruction;
    redundant means in the microprocessor for executing the first op code; and
    non-redundant means in the microprocessor for executing the second op code.

16. The microprocessor of claim 15, wherein the redundant means comprises:
    a first processing unit configured to receive operand data, execute an operation associated with the first op code; and generate a first result;
    a second processing unit configured to receive the operand data; execute the operation, and generate a second result;
    a comparator configured to compare the first and second results.

17. A computer program product comprising a computer-usable medium having computer-readable code embodied therein for execution on a single microprocessor having decode and execution circuitry for decoding and executing fault-tolerant versions of instructions with redundancy checking and for decoding and executing non-fault-tolerant versions of instructions without redundancy checking, the computer program product including:
- a first type of computer-readable instructions comprising fault-tolerant instructions to be executed with redundancy checking; and
- a second type of computer-readable instructions comprising non-fault-tolerant instructions to be executed non-redundantly.

18. The computer program product of claim 17, wherein the first type of computer-readable instructions includes fault-tolerant arithmetic instructions.

19. The computer program product of claim 18, wherein the second type of computer-readable instructions includes non-fault-tolerant arithmetic instructions.

20. The computer program product of claim 17, wherein the first type of computer-readable instructions includes fault-tolerant logical functions.

21. The computer program product of claim 20, wherein the second type of computer-readable instructions includes non-fault-tolerant logical instructions.

* * * * *